Oct. 22, 1968  L. WILCOX  3,406,476
METHOD AND APPARATUS FOR EXHIBITING ORNAMENTAL DESIGNS
Filed March 3, 1966  2 Sheets-Sheet 1

INVENTOR
LUCIA WILCOX
BY
Davis, Hoxie, Faithfull +
Hapgood
ATTORNEYS

Oct. 22, 1968 L. WILCOX 3,406,476
METHOD AND APPARATUS FOR EXHIBITING ORNAMENTAL DESIGNS
Filed March 3, 1966 2 Sheets-Sheet 2

INVENTOR
LUCIA WILCOX
BY
Davis, Hoxie, Faithfull & Hapgood
ATTORNEYS

United States Patent Office 3,406,476
Patented Oct. 22, 1968

3,406,476
METHOD AND APPARATUS FOR EXHIBITING ORNAMENTAL DESIGNS
Lucia Wilcox, Box 534, Amagansett, N.Y. 11930
Filed Mar. 3, 1966, Ser. No. 531,596
2 Claims. (Cl. 40—137)

ABSTRACT OF THE DISCLOSURE

A method of forming and exhibiting a combination of ornamental designs arranged to be viewed from different angular positions, involving the use of rotatable triangular displays integrated with triangular supports.

My invention relates to the art of illustrating distinct images in a composite design as an improved method of ornamentation or exhibiting, and particularly relates to a method of exhibiting and illustrating distinct designs, pictures, and the like, whereby primarily distinct illustrations may be viewed alternatively as distinct pictures as the observer's point of view varies as he moves or may be viewed as a composite of several and whereby the distinct separate illustrations and composites thereof cannot all be observed simultaneously, the observer being required to change viewing angles in traverse from one extreme to the other during a period of time, the appearance being continuously variable with the viewing angle of the observer; and to a unique exhibitor supporting distinct illustrations for independent or combined viewing as stated.

In a primary aspect, an extensive illustration is formed upon a surface of large area, comprising a single integral design, panoramic scene or combination of attractive design effects such as a color spectrum or the like. That surface is then divided into small rectangular units, of a size preferably such that no significantly recognizable image-pattern of the illustration is to be contained in the width of any one unit, but shall extend over several of said units, each of which is mounted in an exhibitor angular to a plane surface support as a series, the composite of which comprises the original illustration; whereby a viewer observing normal to the placement angle may see a composite of all of the units as the original continuing illustration.

A second separate illustration is then formed in the manner and of the same character as the first, but varied to be complementary material to the first. The second illustration, too, is severed into rectangular units each of which is similarly mounted to a plane support at an acute angle to the support, but opposite to the angle of the first mounted illustration, a pair of units of opposite declination meeting as the sides of a pyramid. A viewer observing the second illustration at an angle normal to the mounting angle of its series of units may see the entire second group of units as a single illustration formed by the combined units. With both series of units mounted in this manner, the viewed then may move from the first viewing position observing the first illustration to a position normal to the second illustration to observe the latter, and in passage between the two positions the appearance of each illustration varies, blending from the first to the second, so that the viewer will view a combination of both illustrations in positions between the first and second. In this manner, two distinct illustrations are combined for the purpose of viewing one or the other at alternate angles, and a unique combination of the two illustrations appear to the viewer at angles intermediate said extremes.

In a second aspect of the invention an improved design effect or exhibitor therefor is provided, wherein distinct illustrations are exhibited in a manner whereby unique and pleasing combinations thereof are visible in a kaleidoscopic range of variations of effects in viewing from one illustration through combination thereof with a second as the opposite extreme.

The invention is further described in relation to the drawings wherein.

Figure 1:
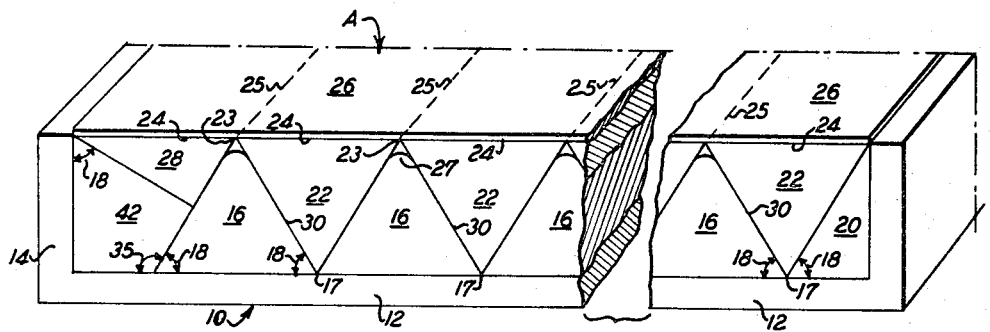
FIG. 1 is a diagrammatic end view of a support arrangement upon which a supporting sheet or canvas may be laid for forming a first illustration image.

Referring to FIG. 1, in forming a first illustration image and assembly of bodies supporting units thereof, a jig 10 comprising a rectangular box having a bottom 12 enclosed by vertical sides and ends 14 is provided to contain jig member bodies 16, 20 and 42. The rectangular area of the jig 10 is selected to correspond to the dimensions of a total composite picture or design and accommodate a series of triangular bodies 22 and the special side triangular body 28 or 52. The angular bodies 42, 16 and 20, which may be of metal or wood, arranged with body 42 at the left side and body 20 at the right side of the jig 10, are placed with their edges 17 contiguous and in a row across the box bottom 12, thus to provide an angular extending ribbed jig for temporary support and alignment of the separate angular bodies 28 and 22 placed thereon. To accommodate the equilateral triangular bodies 22, the angles 18 of angular jig bodies 16, 20 and 42 are made 60° and the angle 35 of body 42 is made 120°. Preferably, the angular bodies 22 are to be equilateral triangular bodies with other angular bodies conforming or adaptable thereto, but other bodies 22 may be utilized which are isosceles triangular bodies having opposite base angles other than 60°, more or less, provided with angles of jig member bodies 16 and other angular bodies are made to conform adaptably to such deviations from the preferred equilateral triangular bodies 22. Supported on the jig, each of the angular bodies 28 and 22 extends from end to end of the jig with their edges 23 meeting contiguously, and their surfaces 24 lying in and forming a continuous horizontal plane from one side 14 of the jig to its opposite side. Each of the triangular bodies 22 are thus merely supported loosely in this manner within the jig. A sheet-like body 26 such as a canvas or other suitable illustration supporting sheet, paper, metal or other surface material is applied upon the assembled surfaces 24.

The sheet 26 is preferably permanently adhered to the separated assembled surfaces 24 of the triangular bodies 22 as a composite, securing each surface 24 of the units 22 into a single surface support bonded together by the single sheet material 26. In that position a selected illustration, view, or design is painted, marked, printed, etched, or has been otherwise transferred or developed thereon a suitable, usually artistic, design in the form of a continuous illustration from side to side. Of course, the design may be preformed on the sheet before applying to the composite surfaces 24. The illustration may be a panoramic scene painted by an artist or it may be some specifically reproduced design effect such as wall paper, or it may be merely a composite of selected colors such as a spectrum of color variations, or any combination of lines or geometric bodies or effects to form thereby an attractively painted or ornamented surface 26, following various artistic methods and procedures known in the art.

Figure 2:
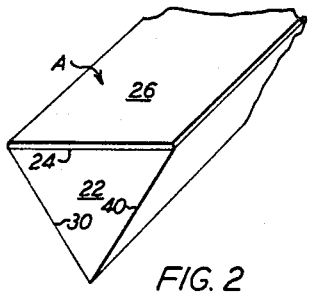
FIG. 2 is a similar diagrammatic end view of one of the triangular bodies supporting one of the units into which the original illustration is severed and mounted.

After the first illustration A on sheet 26 is adhered to the composite of surfaces 24, the illustration A is severed into strips along the edges 23 indicated by dotted lines 25 corresponding thereto so that the entire surface sheet 26 is cut into units A1, A2, A3 . . . A$n$ corresponding to the entire number of surfaces 24 of body 28 and triangular bodies 22 that formed the initial supporting surface for the sheet 26. Referring to FIG. 2, a typical individual body 22 thus has one portion of the illustration A on the corresponding segment of the sheet 26 adhered to its surface 24, with its other surfaces 30 and 40 remaining undisturbed. To facilitate handling of illustration supporting bodies 28, 22, and 52, each of the triangular bodies 16 of the jig may have its upper apex 27 rounded. Each one of the separate angular bodies 22 and body 28 then having adhered thereto a unit portion A1 or A$n$ of the design, body 28 is then removed from the jig 10, each of the bodies 22 is rotated clockwise 120° as though about its axis 23 coincident with the convergence of its surface 24 and 30 and placed so that surface 30 is then disposed uppermost in the left adjacent jig space as indicated in FIG. 3 and an angular body 52 is placed in the vacated jig space at the extreme right side of the jig.

Figure 3:
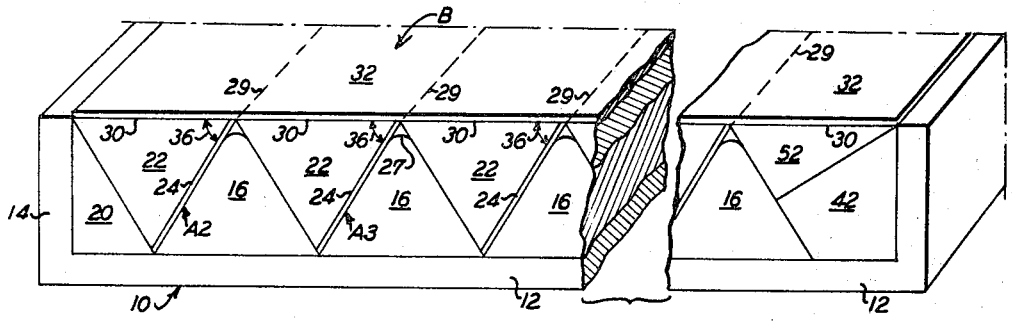
FIG. 3 is a view similar to that of FIG. 1 illustrating the second step which is applied in the formation of the alternate second illustration image.

To accommodate said rotation and placement of bodies 22 and 52, jig member 42 is to be exchanged with jig member 20 so that their relative positions are as shown in FIG. 3. The combination of surfaces 30 of bodies 22 and 52 now form a single continuous upper surface upon which a second sheet 32 is firmly adhered across the entire exposed upper surface of the assembly.

As described for the design A, the sheet 32 adhered firmly across the upper surfaces 30 of the triangles 22 and 52 is now painted, ornamented or decorated with an illustration B continuously across the total surface of the sheet 32 with a contrasting illustration other than that shown as illustration A, but preferably one which when viewed in combination with the illustration A gives a complimentary appearance, a coupled bizarre ornamentation or design effect. The design B, too, can be preformed on the sheet 32 and then adhered to surface 30. The preferred sheets 26 and 32 could, of course, be eliminated and illustrations A and B, respectively, could be drawn, painted, printed or otherwise applied directly to the composite surfaces 24 and 30.

Figure 4:
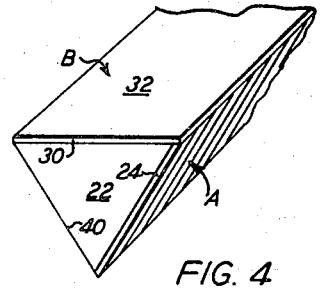
FIG. 4 is a corresponding end view of one of the triangular bodies having two surfaces, each bearing one of the two units of illustration taken from each design, picture, etc.
Figure 5:
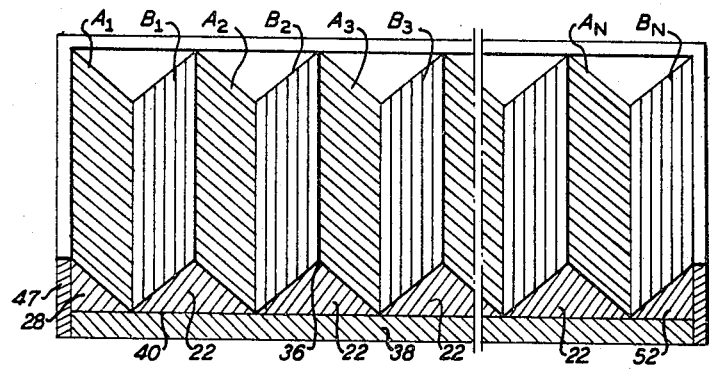
FIG. 5 illustrates the manner of mounting of the series of triangular bodies upon a plane supporting base for angularly exhibiting each pair of units of the series upon alternate angular surfaces.

After completing the illustration or design B, it is severed into strips along contiguous edges, as indicated by the dotted line 29, similarly separating the triangles 22 and the body 52 to individual bodies, each body 22, as shown in FIG. 4, then has one of the unit portions of the design A on its surface 24, as well as one of the unit portions of the design B on the corresponding segment of the sheet 32 adhered on its surface 30, both portions converging at an apex of the triangle 22, shown as angle 36 in FIG. 3. Of course, the other triangles of the severed group carry the complementary portions B1, B2, B3 . . . B$n$ which together form the original design B placed upon the sheet 32 adhered to respective surfaces 30. Triangle 28 and these triangles carry corresponding portions of the A design, A1, A2, A3 . . . A$n$ respectively upon their surfaces 24, and which together complete the design A. The elongated triangular bodies 28, 52, and 22 are then fastened firmly to support base 38 as shown in FIG. 5, where the surfaces 40 form bases of the triangular bodies 22. Sides and ends 47, made of metal or wood, may be secured or attached around and to the supporting base 38 to conceal the edges and ends of bodies 28, 22, and 52, and to provide a suitably visible boundary to the exhibitor structure. Thus the member 28 supporting unit A1 forms the extreme left side of the exhibitor. The member bodies 22 supporting unit pairs form the intermediate body of the structure, and member 52 supporting unit B$n$ forms the extreme right side of the exhibitor.

Figure 6:
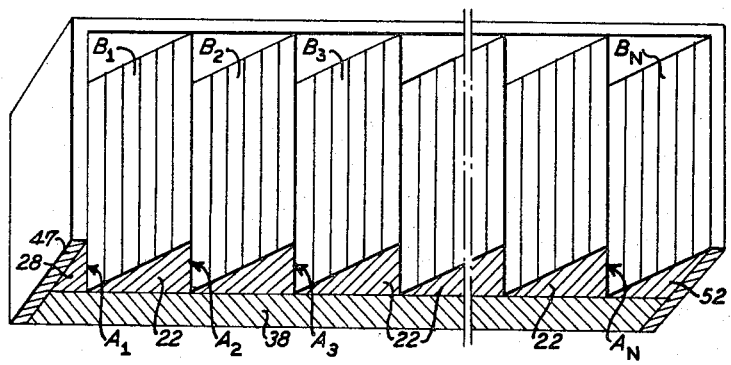
FIG. 6 illustrates a first combined illustration as an assembly of independent units viewed from a left-hand angle.
Figure 7:
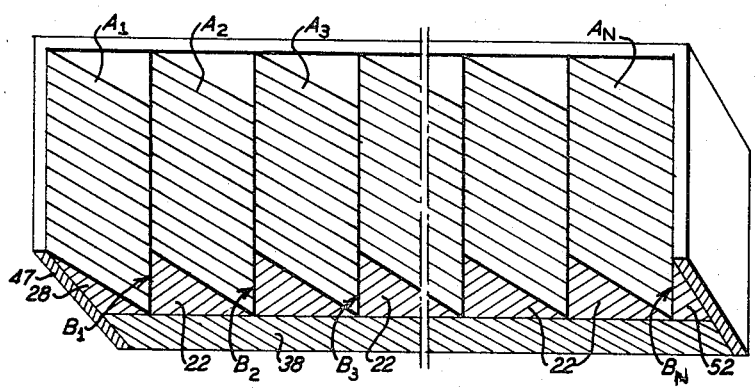
FIG. 7 illustrates the second combined illustration as an assembly of independent units viewed from a right-hand angle.

The units of the original design A are disposed and arranged in the original design series as A1, A2, A3 . . . A$n$ and the units of the original design B become similarly arranged upon the support 38 as B1, B2, B3 . . . B$n$, whereby each of the units of design A are directed at the same angle obliquely to the right to be viewed as a series, the composite of which illustrates the original design, and each of the units of the design B are supported at the same but opposite angle directed obliquely to the left of FIG. 5. Thus, as shown in FIG. 5, further considered in conjunction with FIG. 6, an observer standing at the left of the exhibit sees the complete picture, design or the like B as a composite of separate units B1, B2 . . . B$n$ viewing from the left to observe substantially as shown in FIG. 6, and FIG. 5 considered in conjunction with FIG. 7 viewed from the right, observes the design A as a composite of the units A1, A2, A3 . . . A$n$ as shown in FIG. 7. Thus, one sees, viewing from the right, the composite design of A only as a panoramic unit shown in FIG. 7, and viewing from the left, one observes only the panoramic design B as shown in FIG. 6. Thus, both composite illustrations A and B may be viewed as an equally combined illustration as shown in FIG. 5, as well as any number of combinations continuously varied in a range of views from one near the one extreme shown in FIG. 6 to one near the other extreme shown in FIG. 7.

The invention will have wide application to selection and formation of complementary designs within the skill of available artists. While the system might be applicable to formation of distinct designs upon each unit by the procedure here outlined, it is unnecessary to specially assemble individual units, each of select design, since each unit complements the rest as a continuous design A, or as a continuous design B and since each unit is readily assembled in the order that they were first formed as a composite design A or B, it is necessary only to select the total designs A and B to be complementary to each other for improved design effect.

Certain modifications will occur to those skilled in the art. Wide variation of materials and structures are available for mounting, supporting and exhibiting the designs as combinations of colors and design materials and, accordingly, it is intended that the description and drawings herein be regarded as illustrative and not limiting, except as defined in the claims appended hereto.

I claim:

1. The method of forming and exhibiting art work comprising disposing a series of separate triangular bodies with their edges contiguous to form a continuous surface as a composite of a first series of surfaces of said triangular bodies, supporting the triangular bodies by triangular supports concealed beneath said continuous surface, applying a first single art work design to said continuous surface, separating said triangular bodies and said design at said contiguous edges, rotating said triangular bodies to juxtapose other edges in contiguous relationship to present a second continuous surface composite of a second series of surfaces of said triangular bodies, supporting said triangular bodies by triangular supports concealed beneath said second continuous surface, applying a second single art work design upon said second surface, separating said triangular bodies and said second art work at said juxtaposed contiguous edges and mounting each triangular body in an exhibitor as a series supported on the unmodified third surface as a base and with said first series of contiguous edges uppermost to display said first art work design from one angular viewing position and said second art work design from another angular viewing position.

2. The method as defined in claim 1 in which all of said triangular bodies are equilateral except for two, one at each end of the series, which is a right triangle forming the last body of the series to confine the series at both ends within an exhibitor having substantially perpendicular ends.

References Cited

FOREIGN PATENTS

| | | |
|---|---|---|
| 280,449 | 11/1927 | Great Britain. |
| 411,178 | 6/1934 | Great Britain. |
| 1,025,317 | 1/1953 | France. |
| 852,200 | 10/1952 | Germany. |

LAWRENCE CHARLES, *Primary Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,406,476                                                October 22, 1968

Lucia Wilcox

It is certified that error appears in the above identified patent and that said Letters Patent are hereby corrected as shown below:

Column 1, line 58, "viewed" should read -- viewer --. Column 2, line 3, after "second" insert -- to the second --.

Signed and sealed this 10th day of March 1970.

(SEAL)
Attest:

Edward M. Fletcher, Jr.                      WILLIAM E. SCHUYLER, JR.
Attesting Officer                               Commissioner of Patents